(12) United States Patent
Broadley et al.

(10) Patent No.: US 9,998,850 B2
(45) Date of Patent: Jun. 12, 2018

(54) MULTIPLE COMMUNICATION MODE HEADSET

(71) Applicant: Sonetics Holdings, Inc., Portland, OR (US)

(72) Inventors: Simon Broadley, West Linn, OR (US); Brian VanderPloeg, Lake Oswego, OR (US)

(73) Assignee: Sonetyics Holdings, Inc., Portland, OR (US)

( * ) Notice: Subject to any disclaimer, the term of this patent is extended or adjusted under 35 U.S.C. 154(b) by 30 days.

(21) Appl. No.: 15/190,428

(22) Filed: Jun. 23, 2016

(65) Prior Publication Data

US 2016/0302029 A1    Oct. 13, 2016

Related U.S. Application Data

(63) Continuation-in-part of application No. 15/173,672, filed on Jun. 5, 2016, and a continuation-in-part of
(Continued)

(51) Int. Cl.
*H04W 4/00* (2018.01)
*H04M 1/725* (2006.01)
(Continued)

(52) U.S. Cl.
CPC .......... *H04W 4/008* (2013.01); *H04B 1/385* (2013.01); *H04M 1/6058* (2013.01); *H04M 1/6066* (2013.01); *H04M 1/72527* (2013.01); *H04R 1/1041* (2013.01); *H04W 4/10* (2013.01); *G06F 3/162* (2013.01); *H04M 1/05* (2013.01); *H04R 1/1008* (2013.01); *H04R 1/1066* (2013.01); *H04R 1/1083* (2013.01);
(Continued)

(58) Field of Classification Search
CPC ..................................... H04M 3/568
USPC ......... 381/56, 309, 72; 455/416, 518, 556.1, 455/557; 343/718
See application file for complete search history.

(56) References Cited

U.S. PATENT DOCUMENTS 6,980,165 B2 * 12/2005 Yuasa .................... H01Q 1/273 343/718
7,190,972 B1 * 3/2007 Hollister ........... H04L 29/06027 455/556.1
(Continued)

*Primary Examiner* — Md S Elahee
(74) *Attorney, Agent, or Firm* — Keith L. Jenkins, Registered Patent Attorney, LLC; Keith L. Jenkins

(57) ABSTRACT

A communications headset having multiple modes of communication, including DECT7 wideband and narrow band, Bluetooth®, two-way radio connectivity, and USB connectivity. The system includes a DECT7 transceiver, a Bluetooth® transceiver, a microcontroller, and a digital signal processor (DSP), all connected on a bus. The DSP and a portion of the microcontroller can be reprogrammed via signals through the USB port or via signals from the Bluetooth® transceiver. The reprogramming signals originate from a computer that is temporarily linked to the headset via USB cable or Bluetooth®. The system provides listen-through capability, enabling face-to-face conversation while using DECT7 communications. The DECT7 communications have a noise gate that shuts off all noise when there is no voice signal present. The headset provides substantial hearing protection via passive and active noise cancellation and includes a sound pressure dosimeter.

20 Claims, 13 Drawing Sheets

Related U.S. Application Data application No. 15/045,003, filed on Feb. 16, 2016, and a continuation-in-part of application No. 14/967,284, filed on Dec. 12, 2015, and a continuation-in-part of application No. 14/322,069, filed on Jul. 2, 2014.

(51) Int. Cl.
*H04B 1/3827* (2015.01)
*H04W 4/10* (2009.01)
*H04R 1/10* (2006.01)
*H04M 1/60* (2006.01)
*G06F 3/16* (2006.01)
*H04M 1/05* (2006.01)

(52) U.S. Cl.
CPC .... *H04R 2201/023* (2013.01); *H04R 2410/05* (2013.01); *H04R 2420/07* (2013.01); *H04R 2420/09* (2013.01)

(56) References Cited

U.S. PATENT DOCUMENTS

| | | | |
|---|---|---|---|
| 2007/0142072 A1* | 6/2007 | Lassally | H04B 1/44 455/518 |
| 2007/0254709 A1* | 11/2007 | Higgins | H04B 1/385 455/557 |
| 2013/0223635 A1* | 8/2013 | Singer | H04R 1/1041 381/56 |
| 2014/0274004 A1* | 9/2014 | Koll | H04M 1/6033 455/416 |

* cited by examiner

MULTIPLE COMMUNICATION MODE HEADSET

CROSS REFERENCE TO RELATED APPLICATIONS

This application is a continuation in part of U.S. patent application Ser. No. 15/173,672 filed 5 Jun. 2016 by at least one common inventor the entire disclosure of which is herein incorporated by reference. This application is a continuation in part of U.S. patent application Ser. No. 15/045,003 filed 16 Feb. 2016 by at least one common inventor the entire disclosure of which is herein incorporated by reference. This application is also a continuation in part of U.S. patent application Ser. No. 14/322,069 filed 2 Jul. 2014, by at least one common inventor, the entire disclosure of which is herein incorporated by reference. This application is also continuation in part of U.S. patent application Ser. No. 14/967,284 filed 12 Dec. 2015, by at least one common inventor, the entire disclosure of which is herein incorporated by reference. In addition, this application is a continuation in part of U.S. patent application Ser. No. 15/173,672 filed 5 Jun. 2016, which is a continuation in part of U.S. patent application Ser. No. 15/045,003 filed 16 Feb. 2016, which is a continuation in part of U.S. patent application Ser. No. 14/967,284 filed 12 Dec. 2015, which is a continuation in part of U.S. patent application Ser. No. 14/322,069 filed 2 Jul. 2014.

FIELD OF ART

The present invention relates to providing a communications headset with multiple modes of communication with programmable communications parameters. More particularly, the invention relates to a communications headset with DECT7 multichannel wireless communications, Bluetooth® communications, connectivity to two-way radios, and audible "listen through" capability for face-to-face verbal communications.

STATEMENT REGARDING FEDERALLY SPONSORED RESEARCH AND DEVELOPMENT

None.

BACKGROUND OF THE INVENTION

Headsets are widely used in industry for hearing protection, electronic communication, or both. A headset consists of one or two earpieces that cover the ear or ears of the user, and a headband that couples to the earpiece or earpieces to provide support for the ear piece or earpieces. An earpiece includes an ear cup that supports electronics, manual controls, access points, a ear cushion that surrounds the ear when in use, and one or more portions of couplings for headbands. With the advancement of communications technology, such as DECT 7 compliant technology, large numbers of users (e.g. 200) can be connected to a single communication headset network with subsets of users having particular communications relationship within their subset. In such a busy environment, a signal path to an antenna in such a communications headset may be temporarily blocked or interrupted by the movement of heavy equipment, vehicles, or even the position of the user himself. Various communication environments require adaptability of communications headsets to those environments.

Accordingly, there is a need for a headset that can improve the likelihood of receiving a signal, improving signal quality, and redundancy that can provide a better experience for users of complex communication headset networks. Furthermore, there is a need for a communication headset that has a plurality of communication options and that can operate in high noise environments with reduced risk to hearing and reduced risk of communication loss. Furthermore, there is a need for a communication headset that can be programmed to adapt to various communication environments.

SUMMARY OF THE INVENTION

The invention provides DECT7 multichannel wireless communications, Bluetooth® communications, connectivity to two-way radios, and audible "listen through" capability for face-to-face verbal communications as well as USB connectivity for reprogramming the operating and communications parameters of the communications headset. The invention includes hearing protection in the form of a sound dosimeter, automatic loud noise suppression, and passive noise reduction. Further communication reliability is provided using a noise cancelling microphone. The invention includes an antenna in each of the left and right ear pieces of a communications headset.

The headset may be programmed by connecting the headset, via a USB cable or via Bluetooth® connectivity, to a personal computer (PC) on which resides software, data, and a user interface used for programming the headset. The PC obtains the programming software via an internet connection, which may be wireless. Programming includes installing firmware upgrades into the headset, thereby changing communications parameters. The multiple communication mode headset may alternatively be reprogrammed via Bluetooth® connectivity to the PC.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

As used and defined herein, the term "headset" refers to a communications headset that consists of two ear pieces that cover the ears of the user, and a headband that couples to the earpieces to provide support for the earpieces. An earpiece is defined to include an ear cup that supports electronics, manual controls, access points, an ear cushion that surrounds the ear when in use, and one or more portions of couplings for headbands.

Figure 1:
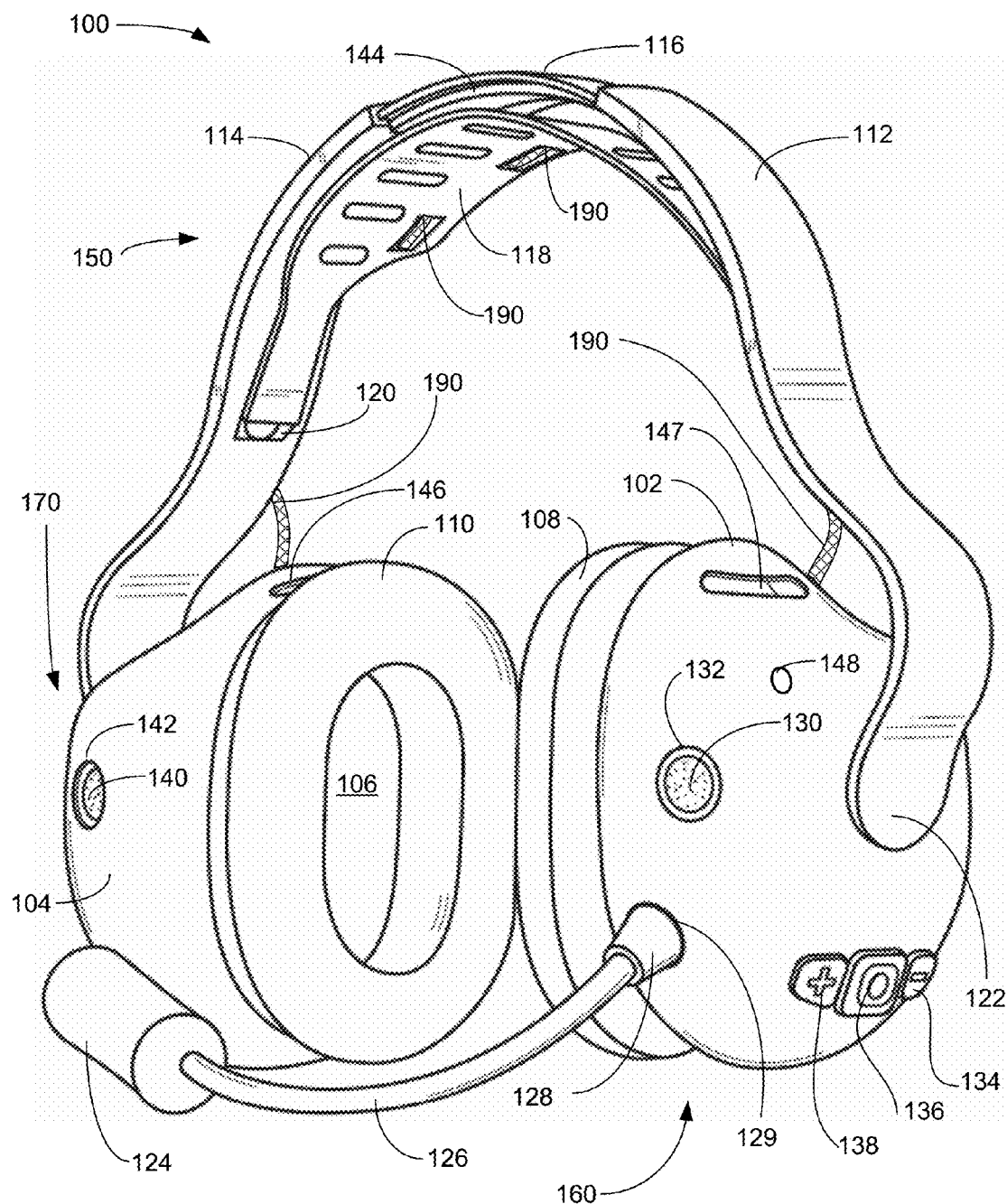
FIG. 1 is a perspective view illustrating an exemplary embodiment of a multiple communication mode headset in a first exemplary configuration, according to a preferred embodiment of the present invention.

FIG. 1 is a perspective view illustrating an exemplary embodiment of a multiple communication mode headset 100 in a first exemplary configuration, according to a preferred embodiment of the present invention. The multiple communication mode headset 100 structurally includes headgear 150, left side communication earpiece 160, and right side communication earpiece 170. Each earpiece 160 and 170 includes a structural ear cup 106 that fits over the users ear (one visible in this view), an ear cushion 108 and 110, respectively extending from the open edge of each ear cup 106, and communications electronics and controls, about which more will be described below. Each earpiece 160 and 170 has, respectively, a ruggedizer 102 and 104 as described in pending U.S. patent application Ser. No. 14/967,284 filed 12 Dec. 2015. Each ruggedizer 102 and 104 comprises a flexible resilient outer cover for each ear cup 106. As earpiece 160 is not the same as earpiece 170, so ruggedizers 102 and 104, respectively, are not identical. Ruggedizers 102 and 104 share some features. Both are made of a flexible resilient material, preferably silicone rubber, shaped adaptively to an exterior surface of an ear cup 106, including conformal portions adapted to protrusions such as buttons and switches. Both ruggedizers 102 and 104 have openings for direct access to access points, such as a DC charging port 406 (see FIG. 4), an LED 148, a strap slot 146 and 147, or cup-mounted microphones 130 and 140 on the exterior surfaces of their respective ear cups 106. Microphone 124 is preferably a noise cancelling microphone 124 with a programmable noise gate. Both ruggedizers 102 and 104 have conformal portions that fit to cover manually activated controls on their respective earpieces 160 and 170 for manual access, through the flexible ruggedizer, to controls on the exterior surfaces of their respective ear cups 106. In a particular embodiment, ear piece 160 and 170 each has an LED 148 (one visible in this view).

Dual antenna cable 190 extends through an opening in the left ear cup 106 and the ruggedizer 102 and is guided over cable support 144 to an opening in ruggedizer 104 and right ear cup 106. In a particular embodiment, ruggedizers 102 and 104 may be omitted. Dual antenna cable 190 carries electric power, received audio, and selected amplified audio between the ear pieces 160 and 170, as will be described in more detail below. Dual antenna cable 190 enables comparison of signals received at left and right earpieces 160 and 170 and selection of the superior signal 636 (See FIG. 6) for use. In a particular embodiment, dual antenna cable 190 is a radio frequency (RF) coaxial cable. In use, the user's head acts as a blocker or attenuator to the RF signal in both transmit and receive modes. In a particular embodiment, transmissions from both sides of the user's head go back to the base station antenna without the user's head blocking the output. The advantage is clearer communication regardless of the orientation to the user's head relative to a communication path to the base station.

The multiple communication mode headset 100 is programmable, in that a programmable digital signal processor 1112 (See FIG. 11) and partially programmable microcontroller 1104 (See FIG. 11) are parts of the communications system 1102 (See FIG. 11) of the multiple communication mode headset 100, as will be discussed further in regard to FIGS. 9-12.

Left ruggedizer 102 has a microphone opening 132 for forward-directed microphone 130 and has a boom opening 129 for the base 128 of a boom 126 for boom microphone 124. Left ruggedizer 102 also has a strap opening 147 for use with a head strap 802 (see FIG. 8), which strap is used when the headgear 150 is rotated backward, relative to the earpieces 160 and 170, to a position behind the user's head (a second configuration of the multiple communication mode headset 100). Left ruggedizer 102 also has an LED opening 148 to provide visibility for a status indicator LED. Lastly, hidden in this view, left ruggedizer 102 has a headgear opening for receiving a coupling between the headgear, at tip 122, and the ear cup 106. Left ruggedizer 102 has conformal portions 134, 136, and 138 covering controls that are manually operated by the user. For example, conformal portion 134 may cover a volume lowering control, conformal portion 136 may cover an answer/menu button, and conformal portion 138 may cover a volume raising button. All of the manually activated controls under conformal portions 134, 136, and 138 can be operated by manually pressing through the ruggedizer 102. The conformal portions 134, 136, and 138 recreate the tactile features of their respective controls for ease of use. Right ruggedizer 104 has an opening 142 for forward-directed microphone 140 and has a strap opening 146 similar to strap opening 147. It should be appreciated that the openings described are merely exemplary, and that more, fewer, or different openings 129, 132, 142, 146, 147, and 148 and/or more, fewer, or different conformal portions 134, 136, and 138 may be used in various embodiments.

Ruggedizers 102 and 104 provide the following advantages to headset 100: improved mechanical shock resistance, improved water resistance, improved dust resistance, improved visibility to others, visual sub net identification, flotation of the entire multiple communication mode headset 100, and noise reduction.

Headgear 150 includes head band sections 112 and 114 coupled together by head band adjuster 116. Head band sections 112 and 114 support head protector 118 at couplings 120 and 220 (see FIG. 2). Cable support 144 is supported by head band portions 112 and 114. Head band portions 112 and 114 couple at tips 122 and 222 (see FIG. 2) to earpieces 160 and 170, respectively. In additional embodiments, ear cups 106 may have various shapes and ruggedizers 102 and 104 may be produced adaptive to such various shapes within the scope of the present invention.

Figure 2:
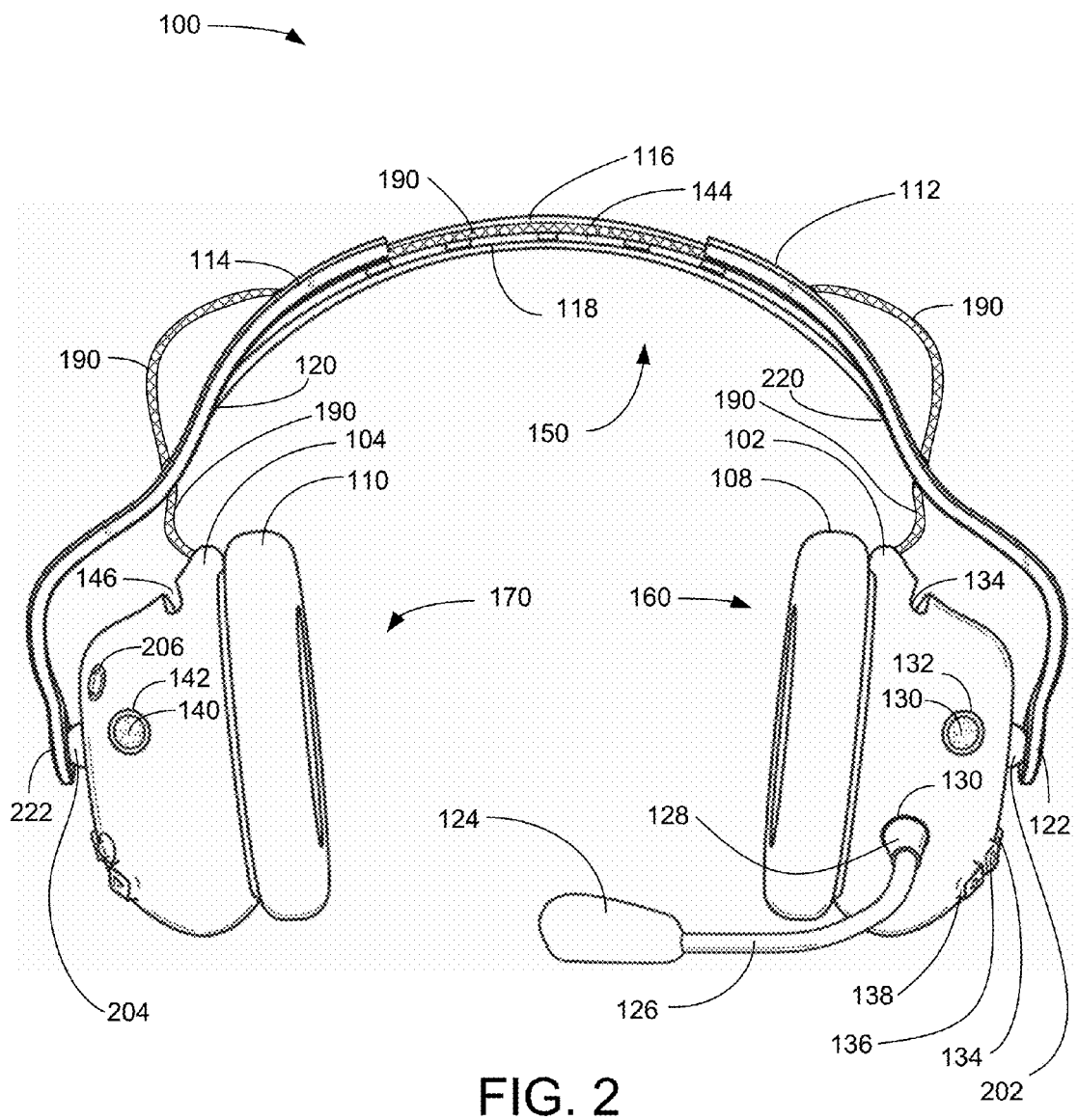
FIG. 2 is a front elevation view illustrating the exemplary embodiment of a multiple communication mode headset in the first exemplary configuration of FIG. 1, according to a preferred embodiment of the present invention.

FIG. 2 is a front elevation view illustrating the exemplary embodiment of a multiple communication mode headset 100 in the first exemplary configuration of FIG. 1, according to a preferred embodiment of the present invention. Dual antenna cable 190 can be seen as having some slack between left ear piece 160 and the cable support 144 and between right ear piece 170 and the cable support 144, which allows for positional adjustability of the earpieces 160 and 170 without straining dual antenna cable 190. The slack is also useful when the headgear is rotated about ball portions 202 and 204 to be positioned behind the user's head in the second configuration.

Additional conformal portion 206 can be seen in this view, as well as ball portions 202 and 204 extending from head band sections 112 and 114, respectively, into sockets in earpieces 160 and 170, respectively. Conformal portion 206 covers the power OFF/ON toggle push-button switch. The headgear couplings using ball portions 202 and 204 are illustrated in the embodiment of FIG. 1 as being a ball and socket joint, but the invention is not so limited.

Figure 3:
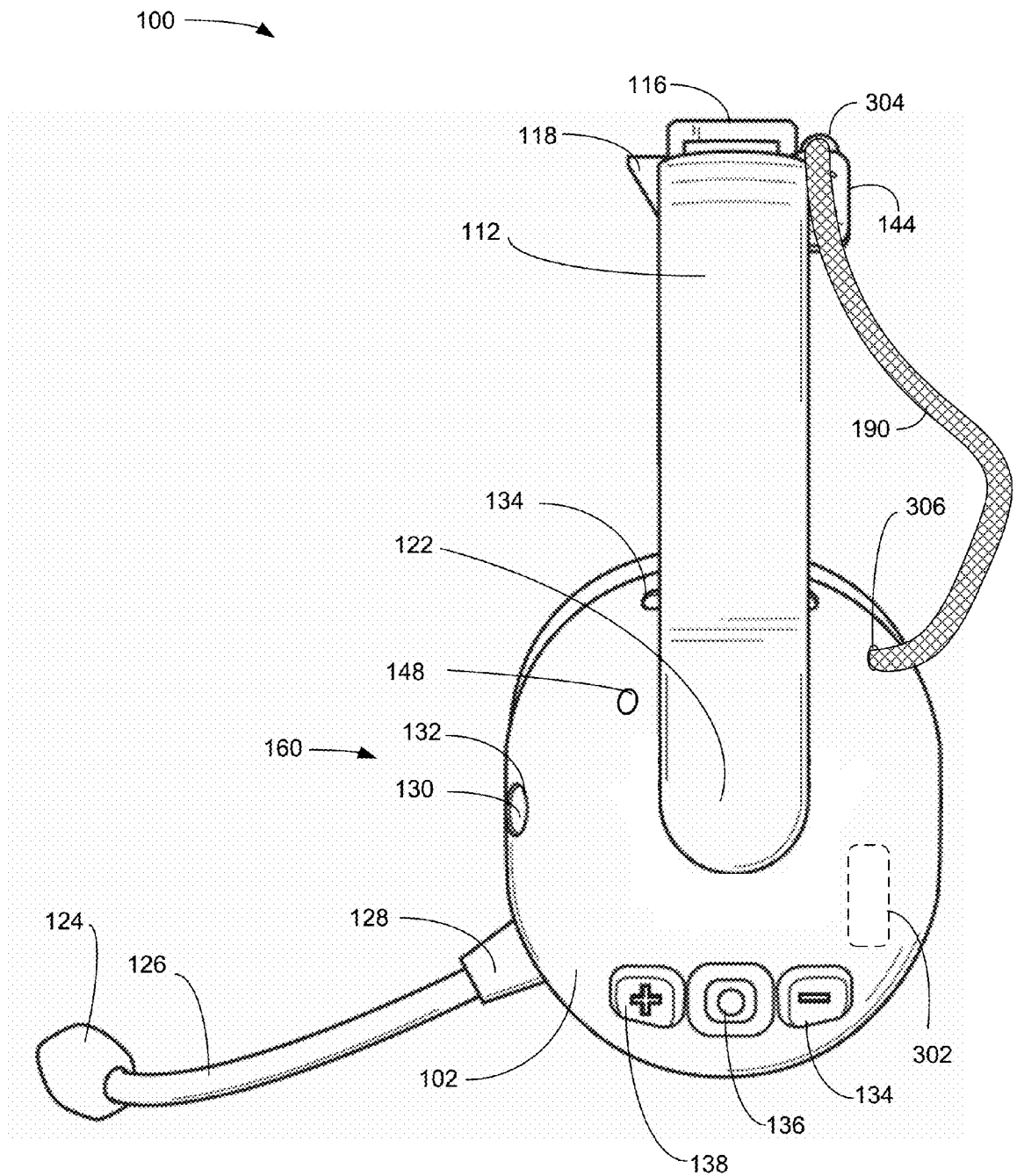
FIG. 3 is a left side elevation view illustrating the exemplary embodiment of the multiple communication mode headset in the first exemplary configuration set of FIG. 1, according to a preferred embodiment of the present invention.

FIG. 3 is a left side elevation view illustrating the exemplary embodiment of the multiple communication mode headset 100 in the first exemplary configuration set of FIG. 1, according to a preferred embodiment of the present invention. Dual antenna cable 190 is secured to cable support 144 using one or more securers 304. Securers 304 may be, without limitation, ties, clamps, clips, and bands. Ruggedizer 102 has an opening 306 for access to an aligned opening in left ear cup 106 for receiving the dual antenna cable 190.

Groove 302 is a groove on the internal surface of the ruggedizer 102 that aligns to a two-way radio port 1134 (See FIG. 11) opening on the external surface of the ear cup 106. Should the user desire to connect a two-way radio to the headset 100, the user can cut along groove 302 to gain physical access to the port 1134 (See FIG. 11). In other embodiments, other groves may be provided for other optional connections. In additional embodiments, various configurations of openings and conformal portions may adapt to corresponding configurations of access points and controls on the ear cup 106.

Figure 4:
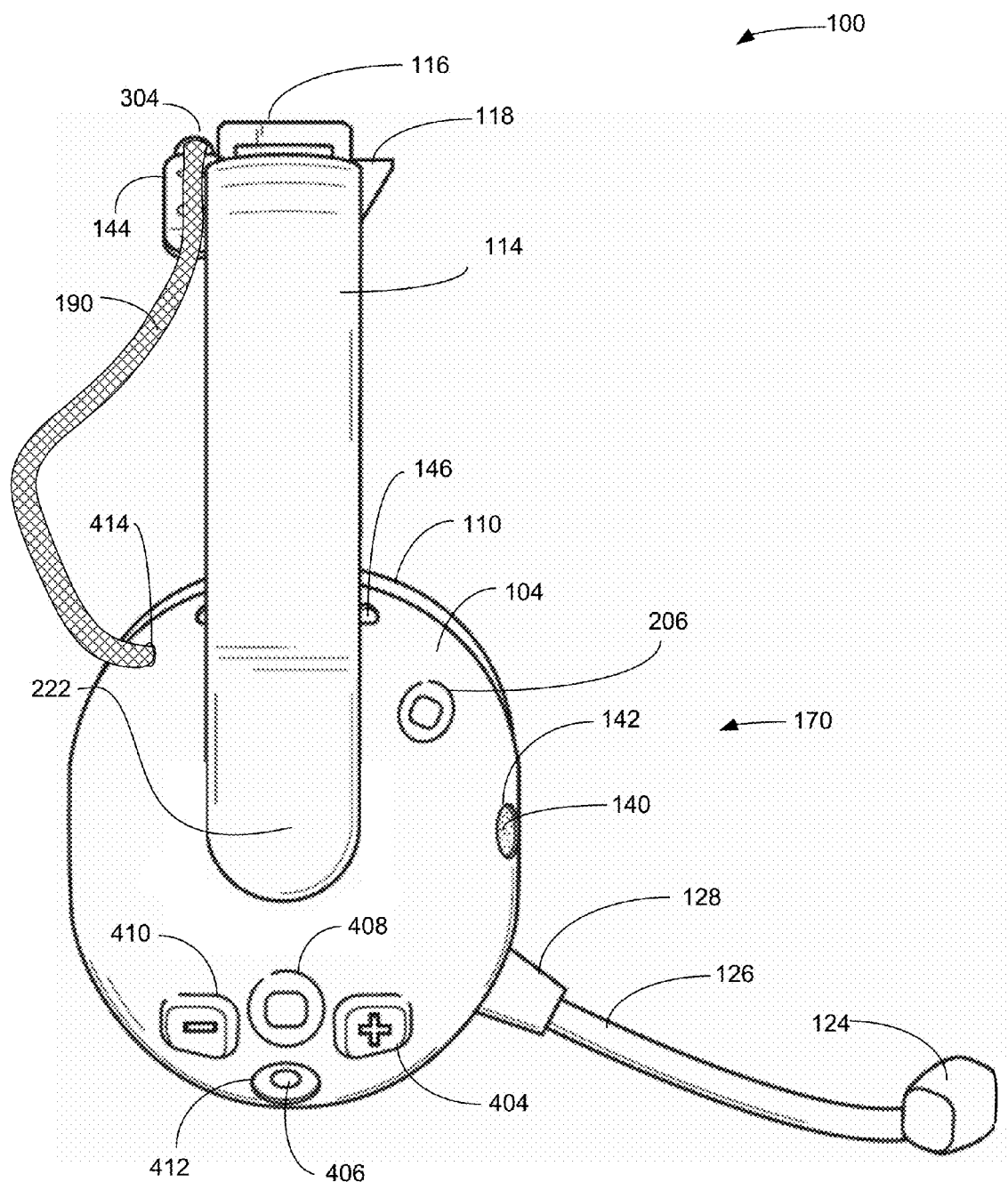
FIG. 4 is a right side elevation view illustrating the exemplary embodiment of the multiple communication mode headset in the first exemplary configuration of FIG. 1, according to a preferred embodiment of the present invention.

FIG. 4 is a right side elevation view illustrating the exemplary embodiment of the multiple communication mode headset 100 in the first exemplary configuration of FIG. 1, according to a preferred embodiment of the present invention. Dual antenna cable 190 is secured to cable support 144 using one or more securers 304. Securers 304 may be, without limitation, ties, clamps, clips, and bands. Ruggedizer 104 has an opening 414 for access to an aligned opening in right ear cup 106 for receiving the dual antenna cable 190.

A power button conformal portion 206 of the ruggedizer 104 allows the user to manually actuate the power (PWR) push button through the flexible and resilient ruggedizer 104. Turning the headset 100 off requires the PWR button to be depressed for at least three hundred milliseconds. Power jack opening 412 in ruggedizer 104 enables access to DC power jack 406 for providing direct power and for recharging the internal battery. A push-to-talk (PTT) button conformal portion 408 of the ruggedizer 104 allows the user to manually actuate the PTT button through the flexible and resilient ruggedizer 104. In addition, for Bluetooth® pairing, both the PWR and the PTT must be pressed for between five and seven seconds. Down-channel selector switch conformal portion 410 of ruggedizer 104 allows the user to manually actuate the down-channel selector switch, for selecting DECT7 channels, through the flexible and resilient ruggedizer 104. Up-channel selector switch conformal portion 404 of ruggedizer 104 allows the user to manually actuate the up-channel selector switch, also for selecting DECT7 channels, through the flexible and resilient ruggedizer 104. In additional embodiments, various configurations of openings and conformal portions may adapt to corresponding configurations of access points and controls on the ear cup 106.

Figure 5:
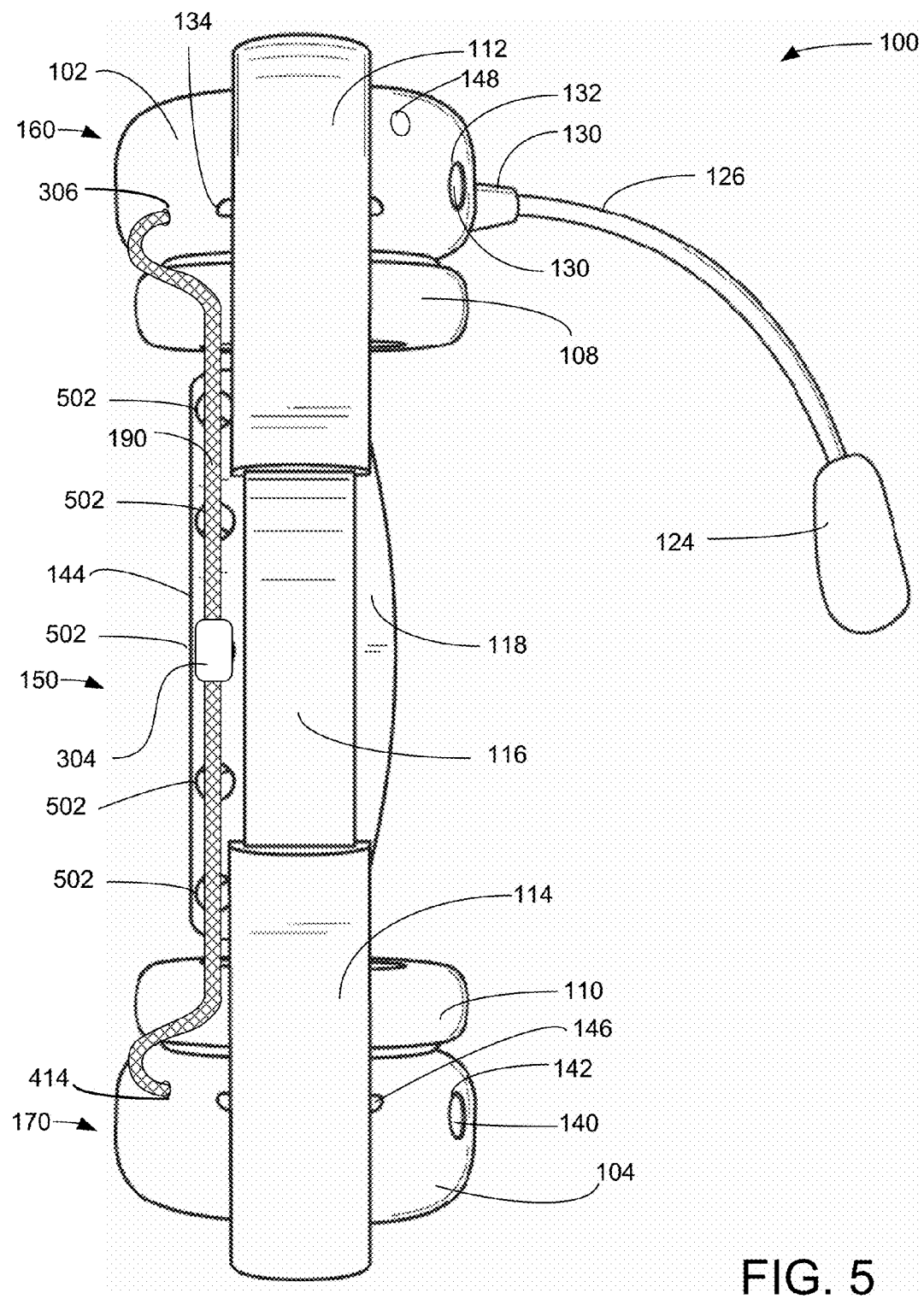
FIG. 5 is a top plan view illustrating the exemplary embodiment of the multiple communication mode headset in the first exemplary configuration of FIG. 1, according to a preferred embodiment of the present invention.

FIG. 5 is a top plan view illustrating the exemplary embodiment of the multiple communication mode headset 100 in the first exemplary configuration of FIG. 1, according to a preferred embodiment of the present invention. Cable threading bores 502 in cable support 144 enable a dual antenna cable 190 to be secured for connection between earpieces 160 and 170. Securer 304 cooperates with a cable threading bore 502 to secure the dual antenna cable 190 to the cable support 144. In some embodiments, a plurality of securers 304, corresponding one-to-one with the plurality of cable threading bores 502, may be used.

In another embodiment, the dual antenna cable 190 may be threaded through an even number of cable threading bores 502 to maintain control of dual antenna cable 190 to move with headgear 150. In various other embodiments, more or fewer cable threading bores 502 may be used. In various additional embodiments, cable threading bores 502 may have various cross-sectional shapes.

Figure 6:
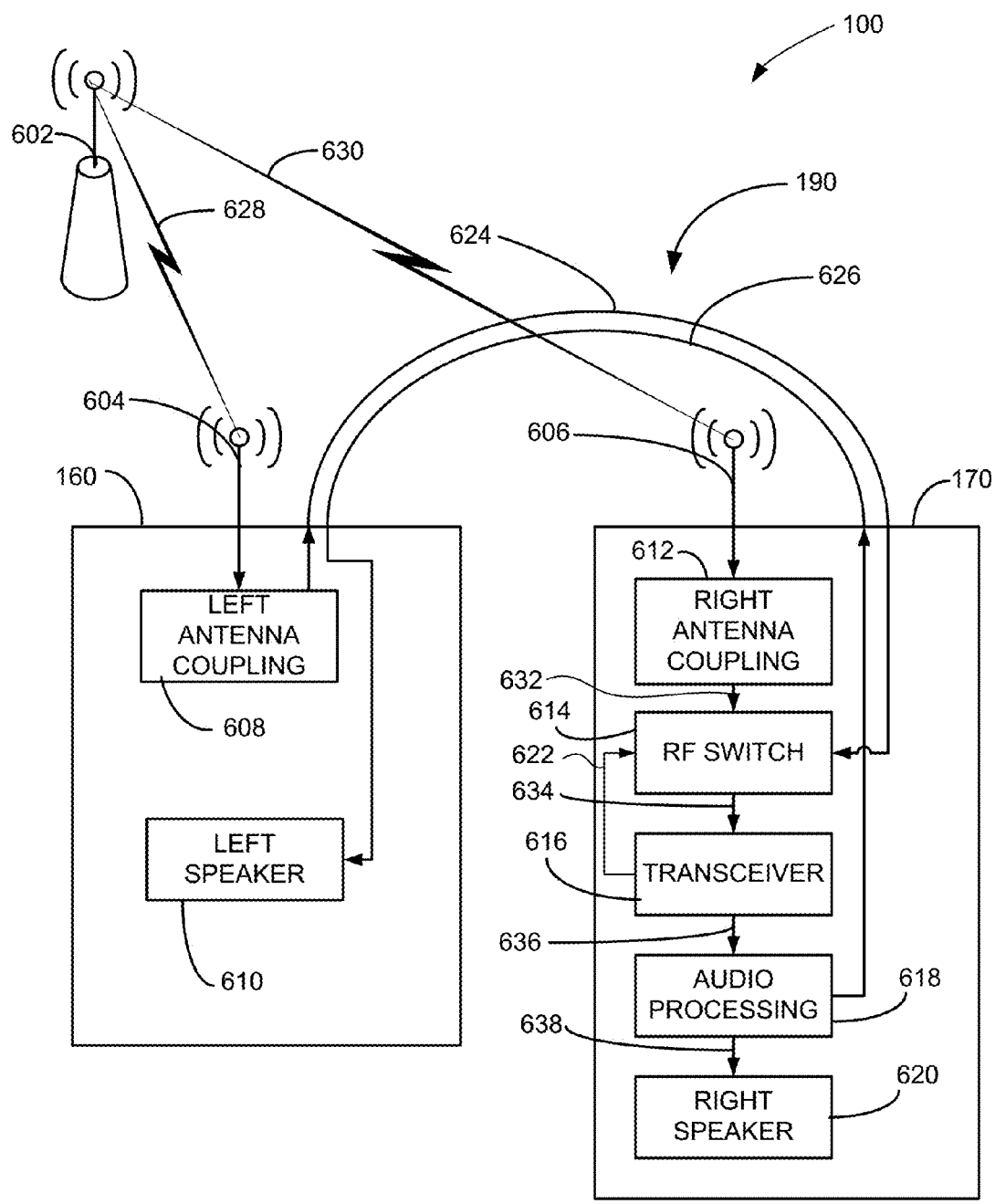
FIG. 6 is a diagrammatic view illustrating the exemplary embodiment of the multiple communication mode headset in the first exemplary configuration of FIG. 1, according to a preferred embodiment of the present invention.

FIG. 6 is a diagrammatic view illustrating the exemplary embodiment of the multiple communication mode headset 100 in the first exemplary configuration of FIG. 1, according to a preferred embodiment of the present invention. Remote transceiver antenna 602 communicates with left ear piece 160 via left ear piece antenna 604 over wireless signal link 628. Concurrently, remote transceiver antenna 602 communicates the same signal content with right ear piece 170 via right ear piece antenna 606 over wireless link 630. Left and right ear piece antennas 604 and 606 are illustrated as being outside of their respective earpieces 160 and 170 for simplicity of the drawing. In practice the left and right ear piece antennas 604 and 606 are inside their respective earpieces 160 and 170, in which the ear cups 106 are substantially transparent at the communication frequency band. Link 628 is shorter than link 630, and so may have a stronger signal and, therefore, be preferred. The user's head and/or headgear may block or interfere with the incoming link 628 or 630 giving the unblocked antenna 604 or 606, respectively, a better signal quality. Other factors may impact the selection of the superior signal 636, including, without limitation, signal to noise ratio, reflective pathways, electronic interference, and environmental factors. RF switch 614 is under the control of transceiver 616 via control line 622.

The received signal from link 628 at antenna 604 is conducted to left antenna coupling 608 that supplies the left antenna signal 624 to RF switch 614 via a line in dual antenna cable 190. The received signal from link 630 at antenna 606 is conducted to right antenna coupling 612 that supplies the right antenna signal 632 to RF switch 614 via line 632 in right ear piece 170. RF switch 616 determines which of the right and left antenna signals 632 and 624 is superior. A control input signal 634 switches transceiver 616 to send the superior signal 636 to audio processor 618. Transceiver 616 is preferably implemented via an integrated circuit as switching logic, and may reside on the same integrated circuit as the RF switch 614. Amplified superior signal 638 is supplied to the left speaker 610 via a line 626 in dual antenna cable 190 and to the right speaker 620 via direct line 638.

In a particular embodiment, the dual antenna functionality shown in ear pieces 160 and 170 may be interchanged. In another particular embodiment, the combined functionality shown in ear pieces 160 and 170 may reside in each ear piece 160 and 170 for redundancy.

Figure 7:
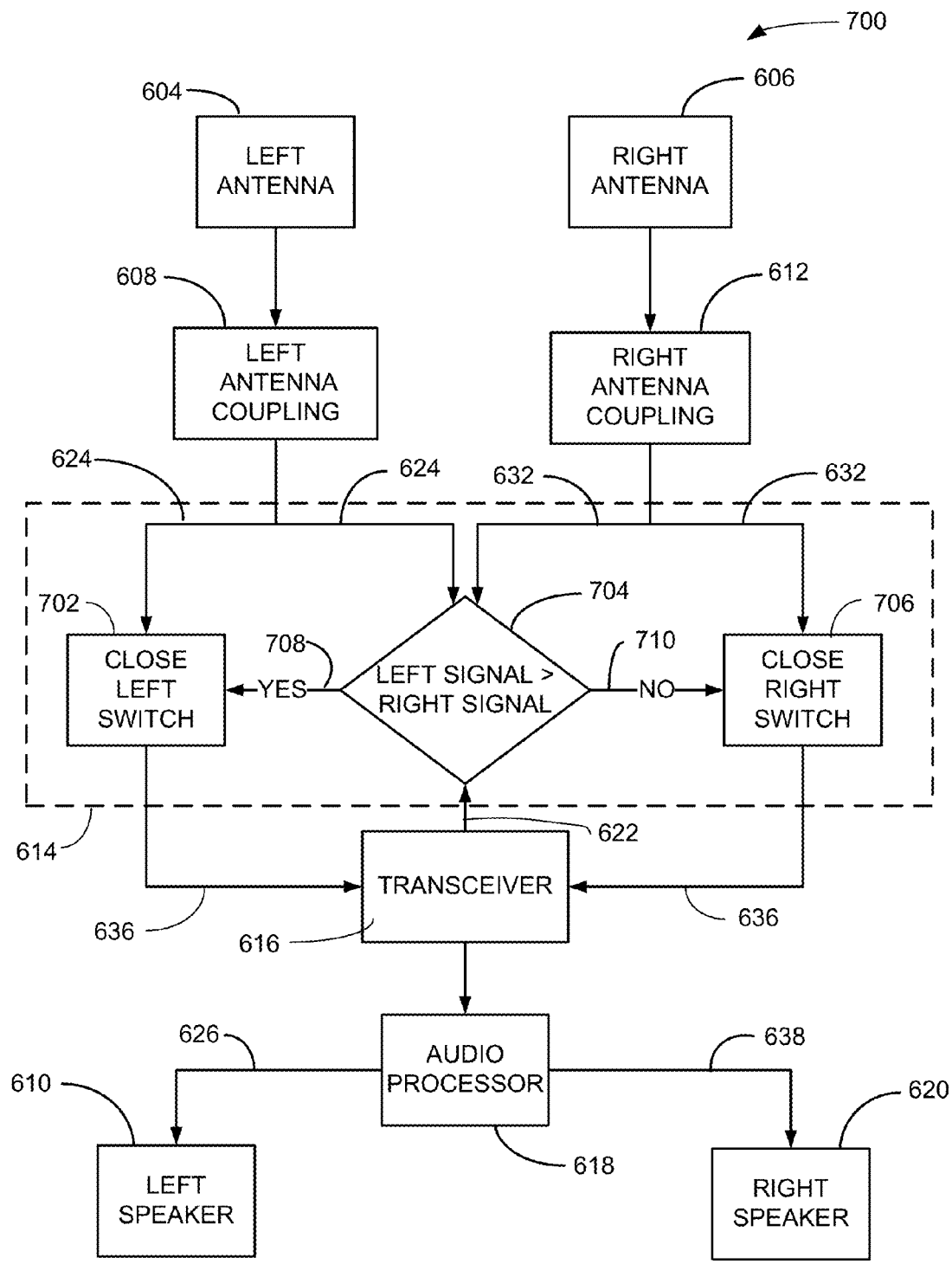
FIG. 7 is a diagram view illustrating the exemplary embodiment of a process of the exemplary embodiment of the multiple communication mode headset in the first exemplary configuration of FIG. 1, according to a preferred embodiment of the present invention.

FIG. 7 is a diagram view illustrating the exemplary embodiment of a process 700 of the exemplary embodiment of the multiple communication mode headset 100 of FIG. 1, according to a preferred embodiment of the present invention. Switches 702 and 706 are normally open switches that close, only one at a time, based on the outputs 708 and 710 of comparator 704, thereby supplying the selected superior signal to the audio processor 618, which may include an amplifier. Updating of the RF switch 614 output 636 happens at a small integer divisor (such a divisor of one) of the clock speed for the circuits, and in any case more than thirty times per second, such that the granularity of antenna selection changes is undetectable to the user. Those of skill in the art, enlightened by the present disclosure, will be aware of various ways to implement the functionality of process 700 in hardware, firmware, software, or combinations thereof, all of such ways are within the scope of the present invention.

Figure 8:
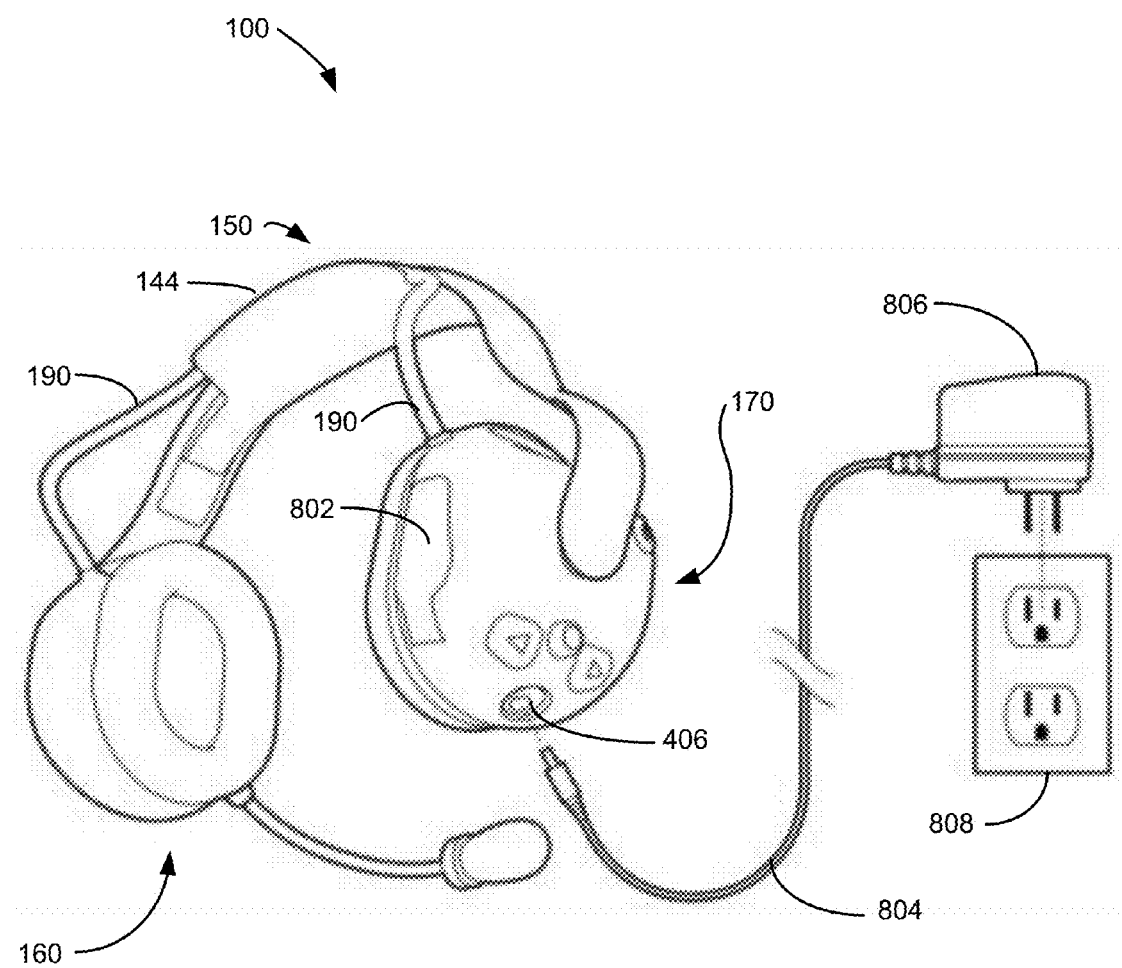
FIG. 8 is a perspective view illustrating the exemplary embodiment of the multiple communication mode headset in the first exemplary configuration of FIG. 1, according to a preferred embodiment of the present invention.

FIG. 8 is a perspective view illustrating the exemplary embodiment of the multiple communication mode headset 100 in the first exemplary configuration of FIG. 1, according to a preferred embodiment of the present invention. Dual antenna communications headset 100, illustrated without ruggedizers 102 and 104, includes battery compartment 802 for removing and installing a rechargeable commercial-off-the-shelf battery. The battery may be recharged from a power source, such as wall socket 808, via a transformer 806 and cable 804 connecting to the DC power jack 406. Various transformers 806 may be supplied, adapted to various power sources. In a particular embodiment, each earpiece may have a battery compartment 802 and a battery, with recharging access to DC charging port 406 for the left earpiece 160 via dual antenna cable 190.

Figure 9:
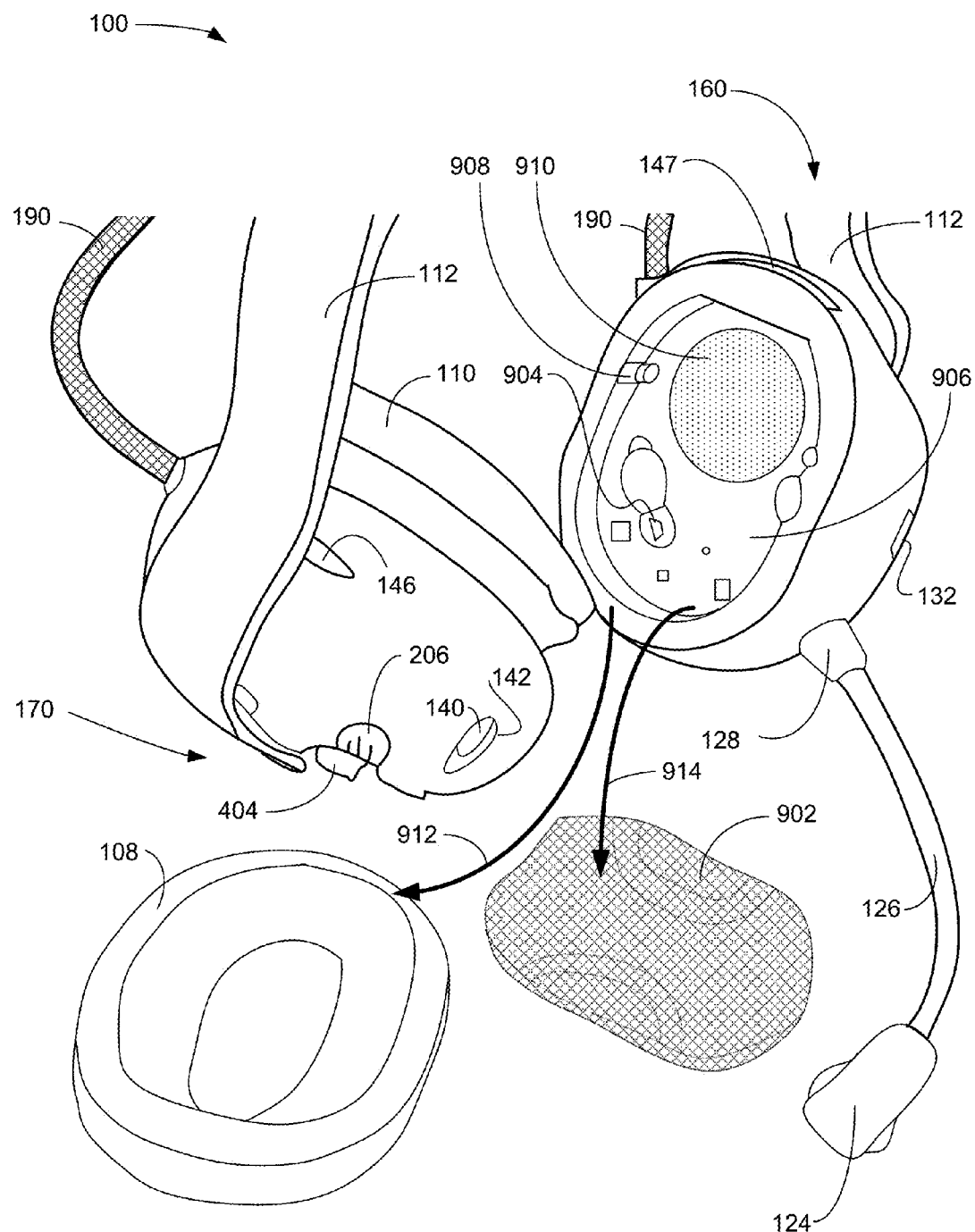
FIG. 9 is a perspective view illustrating the exemplary embodiment of the multiple communication mode headset in the first exemplary configuration of FIG. 1, according to a preferred embodiment of the present invention.

FIG. 9 is a perspective view illustrating the exemplary embodiment of the multiple communication mode headset 100 in the first exemplary configuration of FIG. 1, according to a preferred embodiment of the present invention. Left side communication earpiece 160 is shown with ear cushion 108 removed 912 by manual operation and foam pad 902 subsequently removed 914 by manual operation to expose USB female connector 904, or USB socket 904. USB female connector 904 is supported on back plate 906, as is speaker grill 910. USB female connector 904 receives a male USB connector on a data link 1002 (see FIG. 10), which is preferably a mini-USB connector. In other embodiments, USB female connector 904 may be a standard sized USB connector 904. USB female connector 904 is in communication with a communication system 1102 (See FIG. 11) of the multiple communication mode headset 100, which includes a programmable digital signal processor 1110 (See FIG. 11).

Figure 10:
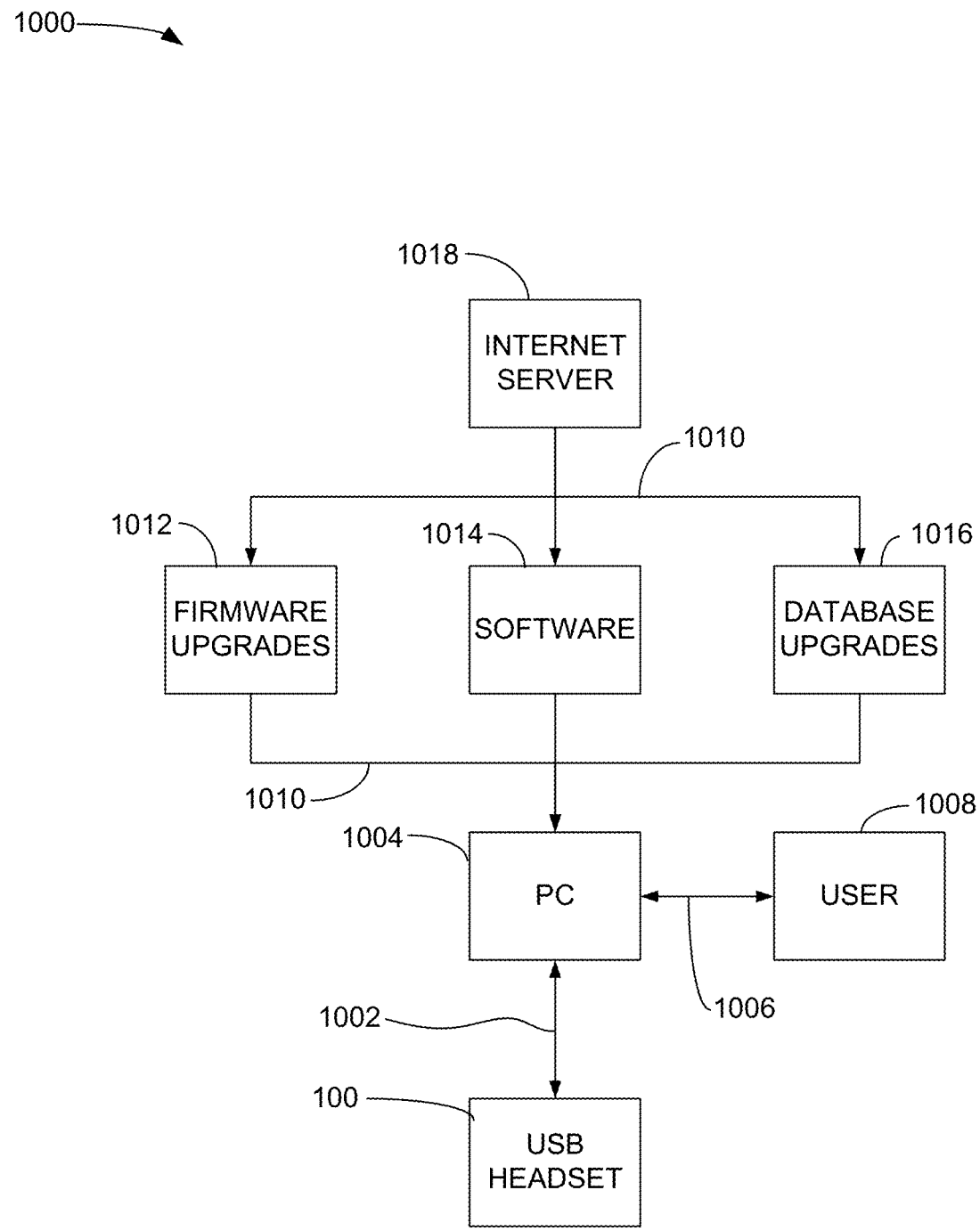
FIG. 10 is a block diagrammatic view illustrating an exemplary embodiment of the programming system for the exemplary embodiment of the multiple communication mode headset of FIG. 1, according to a preferred embodiment of the present invention.

FIG. 10 is a block diagrammatic view illustrating an exemplary embodiment of the programming system 1000 for the exemplary embodiment of the multiple communication mode headset 100 of FIG. 1, according to a preferred embodiment of the present invention. Multiple communication mode headset 100 receives data link 1002 from PC 1004 operated via user interface 1006 by user 1008. Data link may be a USB cable from the PC 1004 or a Bluetooth® link between the multiple communication mode headset 100 and the PC 1004. PC 1004 hosts software 1014 enabling a user 1008 to interact with multiple communication mode headset 100 to install firmware upgrades 1012 and/or database upgrades 1016 onto multiple communication mode headset 100. Firmware upgrades 1012 and/or database upgrades 101 are preferably downloaded from an internet server 1018 to the PC 1004 over internet connection 1010, which may be, at least in part, wireless. Software 1014 resides on the PC 1004 and is also, preferably, down loaded via Internet connection 1010. Software 1014 enables user 1008 to change selectable communication parameters, change safety parameters, read data from the multiple communication mode headset 100, program the multiple communication mode headset 100, set control parameters within the multiple communication mode headset 100, and manage firmware upgrades 1102.

Figure 11:
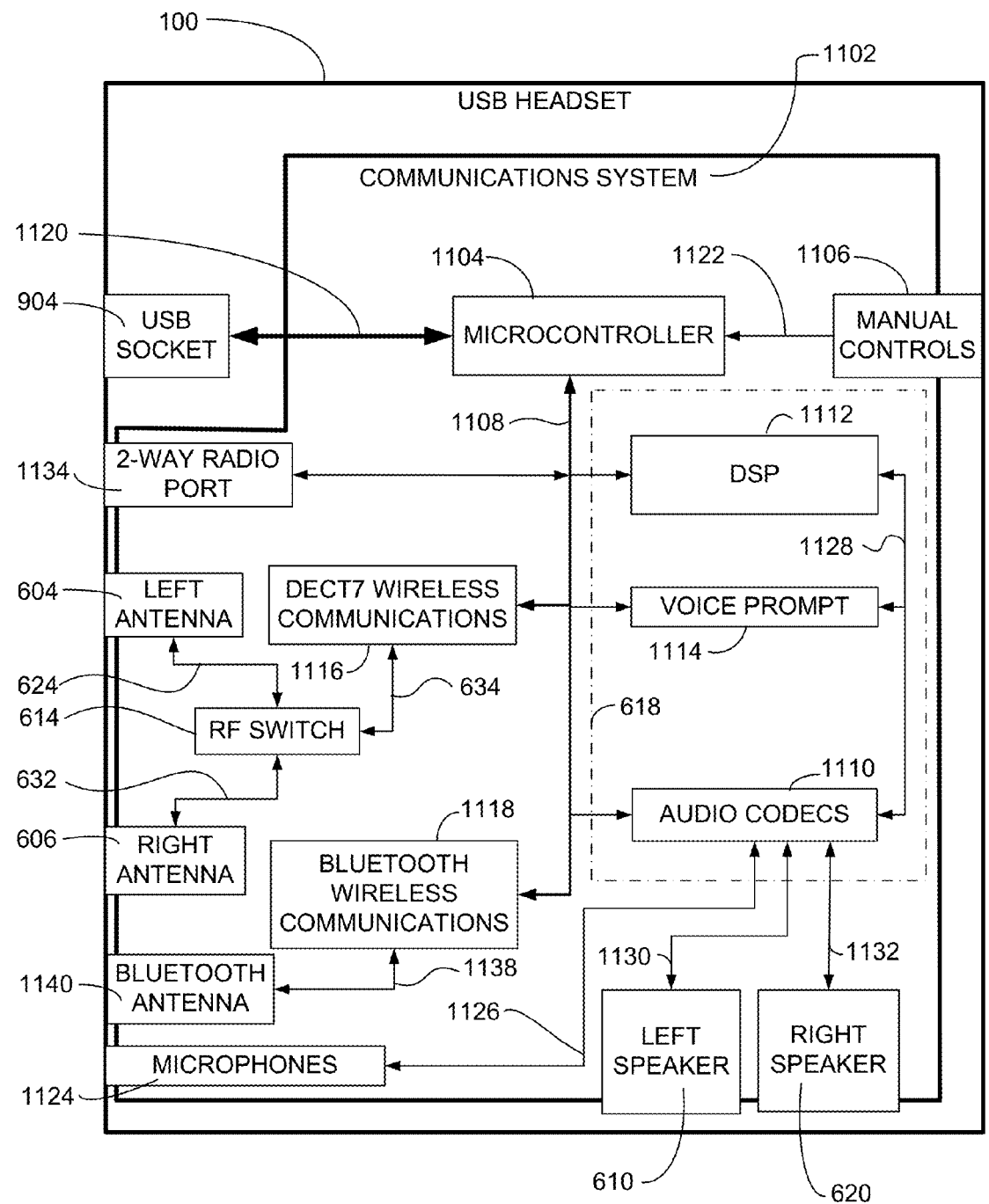
FIG. 11 is a block diagrammatic view illustrating the exemplary embodiment of the multiple communication mode headset of FIG. 1, according to a preferred embodiment of the present invention.

FIG. 11 is a block diagrammatic view illustrating the exemplary embodiment of the multiple communication mode headset 100 of FIG. 1, according to a preferred embodiment of the present invention. Multiple communication mode headset 100 includes a communication system 1102 that includes a microcontroller 1104 that is in hardwired communication 1120 with the USB socket 904 and in hardwired communication 1122 with manual controls 1106. Microcontroller 1104 and Audio Processing 618 communicate using a multiple line bus interface 1108, or main bus 1108, which may contain i2c, i2s, and analog signals. In other embodiments, other bus technologies or individual communication would be acceptable. In other embodiments, other bus technologies or individual communication would be acceptable. The microcontroller 1104 hosts all of the primary functions like handling button press events from manual controls 1106 via communication path 1122, and power up and power down sequencing. In a particular embodiment, communication path 1122 may be part of main bus 1108. All systems level tasks are handled by the microcontroller 1104. Manual controls 1106 preferably include, without limitation, ON/OFF power switch, volume lowering control, answer/menu button, a volume raising button, push-to-talk (PTT) button, down-channel selector switch, and up-channel selector switch. Communications subsystems include digital signal processor (DSP) 1112, voice prompt 1114, Audio Codec 1110, DECT7 wireless communications 1116, and Bluetooth® wireless communications 1118. Optional Two-Way Radio Port 1134 is preferably connected to the main bus 1108.

Digital signal processor (DSP) 1112, voice prompt 1114, and audio codec 1110 are connected by an i2s bus 1128 for audio signals and together provide audio processing 618. In other embodiments, any two or all three of the digital signal processor (DSP) 1112, voice prompt 1114, and Audio Codec 1110 may be combined on either a circuit board or an integrated circuit chip. The DSP 1112 processes all of the audio for the headset 100. The noise gate, equalization setting, and other audio processing takes place in the DSP 1112. The DSP 1112 also acts as an audio mixer sending the audio signals to the desired locations. The voice prompt 1114 contains the voice prompt library to produce voice prompt announcements to the user. The voice prompt 1114 may also record information for use at a later date. The audio codecs 1110 provide analog to digital and digital to analog convertors for the DSP 1112. In a particular embodiment, the converters may be contained within the DSP 1112 or stand alone. In a particular embodiment, some converters may be integral to the DSP 1112 with additional convertors in the audio codecs 1110. The audio codecs 1110 interface with the microphones 1124 via analog signal line 1126 and interfaces as well with the speakers 610 and 620 via analog signal lines 1130 and 1132, respectively, via amplifiers (not shown). Microphones 1124 include the boom microphone 124 and the cup-mounted microphones 130 and 140.

DECT7 wireless communications 1116, comprising transceiver 616, receives RF signals, using the DECT7 protocol, from RF switch 614 via communications path 634. The output of RF switch 614 is the superior signal from either left antenna 604, via communications path 624, or right antenna 606, via communications path 632. DECT7 wireless communications 1116 also provides RF output, using the DECT7 protocol, via communications path 634 to the RF switch 614 and then to either left antenna 604, via communications path 624, or right antenna 606, via communications path 632, depending on which antenna has the best link. DECT7 wireless communications 1116 sends data from received RF signals to the DSP 1112 via main bus interface 1108.

DECT7 wireless communications 1116 is backwards compatible with Sonetics first generation DECT and DECT6 wireless base stations. DECT7 wireless communications 1116 enables a listen-only mode of operation, thereby reducing power consumption, and allowing additional headsets to connect to a given wireless base station simultaneously. In listen only mode, the user may press the PTT button to momentarily talk on any available communications slot. A tone is emitted to let the user know when a slot is available. Once paired with a base station, the multiple communication mode headset 100 will remember the base station and will automatically reconnect whenever the multiple communication mode headset 100 is turned on. DECT7 wireless communications 1116 transmits in high definition wide band audio format, making language easier to understand and improves interfaces with voice-activated control systems. If not wanted, wide band transmission mode can be switched to narrow band transmission mode.

DECT7 wireless communications 1116 may be configured in radio transmit mode to transmit a signal to radios connected to the DECT7 wireless base station and intercom of a Sonetics DECT7 wireless communication system. One intercom may connect a plurality of wireless base stations. In particular configurations of the intercom and base stations, the user may broadcast over multiple radios simultaneously. Radio transmit mode may be deselected by the user. Another particular configuration of base stations with an intercom enables the user to have access to multiple channels. A large team of users may have separate channels for various activities and also be able to change channels to become one communication team.

DECT7 wireless communications 1116 will activate an audible alarm if the multiple communication mode headset 100 is about to go out of range (about 1,600 feet) of the base station. The DECT7 base stations use proximity pairing, and will only pair to multiple communication mode headsets 100 in close proximity.

Bluetooth® antenna 1140 receives RF signals from Bluetooth® wireless communications 1118, comprising a transceiver, via communications path 1138. Bluetooth® wireless communications 1118 also provides RF output via communications path 1138 to the Bluetooth® antenna 1140, via communications path 1138. Bluetooth® wireless communications 1118 sends data from received RF signals to the DSP 1112 via main bus 1108, and receives data from the DSP 1112 for encoding onto the outgoing Bluetooth® RF signal. The device to which the multiple communication mode headset 100 may be paired via Bluetooth® wireless communications 1118 may be any Bluetooth® enabled device. For non-limiting examples, the device may be a cellular telephone, and iPod, a PC, or a tablet. When paired with a cellular telephone, the user can make telephone calls without removing the headset and may use voice activation features on the phone.

Reprogramming of the DSP 1112, as by a firmware upgrade, may be by a PC connected to USB socket 904 or via Bluetooth® wireless communications 1118. Microcontroller 1104 manages the reprogramming tasks within the multiple communication mode headset 100. Portions of the microcontroller 1104 may also be reprogrammed. In particular embodiments, microcontroller 1104 may be implemented with multiple integrated circuits.

Figure 12:
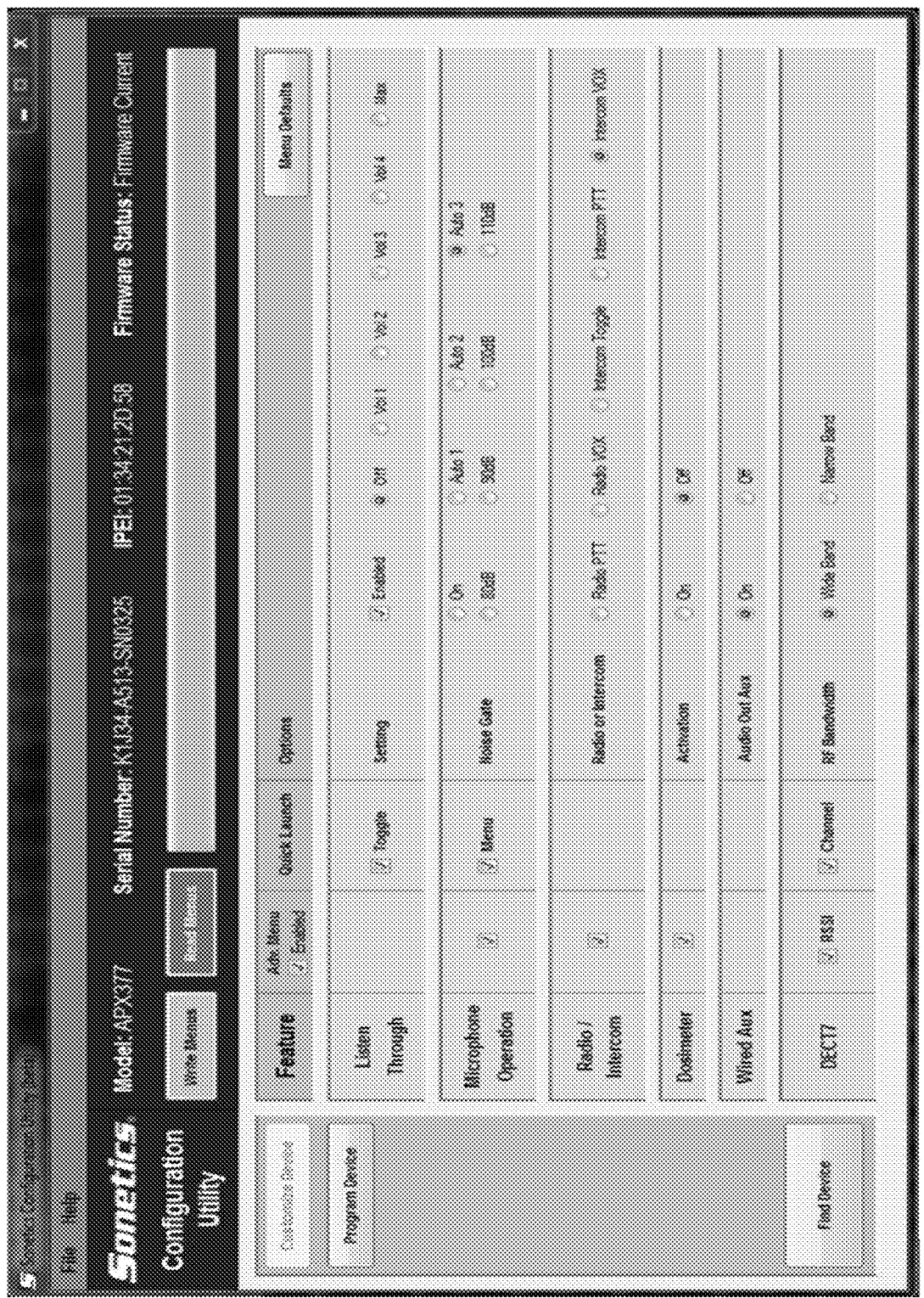
FIG. 12 is a screen shot view illustrating the exemplary embodiment of a user interface of the programming system for the exemplary embodiment of the multiple communication mode headset of FIG. 1, according to a preferred embodiment of the present invention.

FIG. 12 is a screen shot view illustrating a first exemplary screen 1200 of an exemplary embodiment of a user interface 1006 of the programming system for the multiple communication mode headset 100 of FIG. 1, according to a preferred embodiment of the present invention. The text on the screen 1200 shot is not intended to convey textual information in this patent application, but only image information. The first exemplary screen 1200 is concerned with configuration of control parameters. The user interface 1006 provides radio button icons for: enabling a listen-through logic, which allows the user to hear nearby voices while using the radio or intercom, and a volume level for the listen-through threshold; selecting a noise gate for the noise cancelling microphone 140; selecting between radio and intercom with either push-to-talk or voice activation (VOX); activation of a sound pressure level dosimeter; activating a wired auxiliary output from the headset; and selecting a DECT7 bandwidth. In various other embodiments, more or fewer parameters may be selectable.

Figure 13:
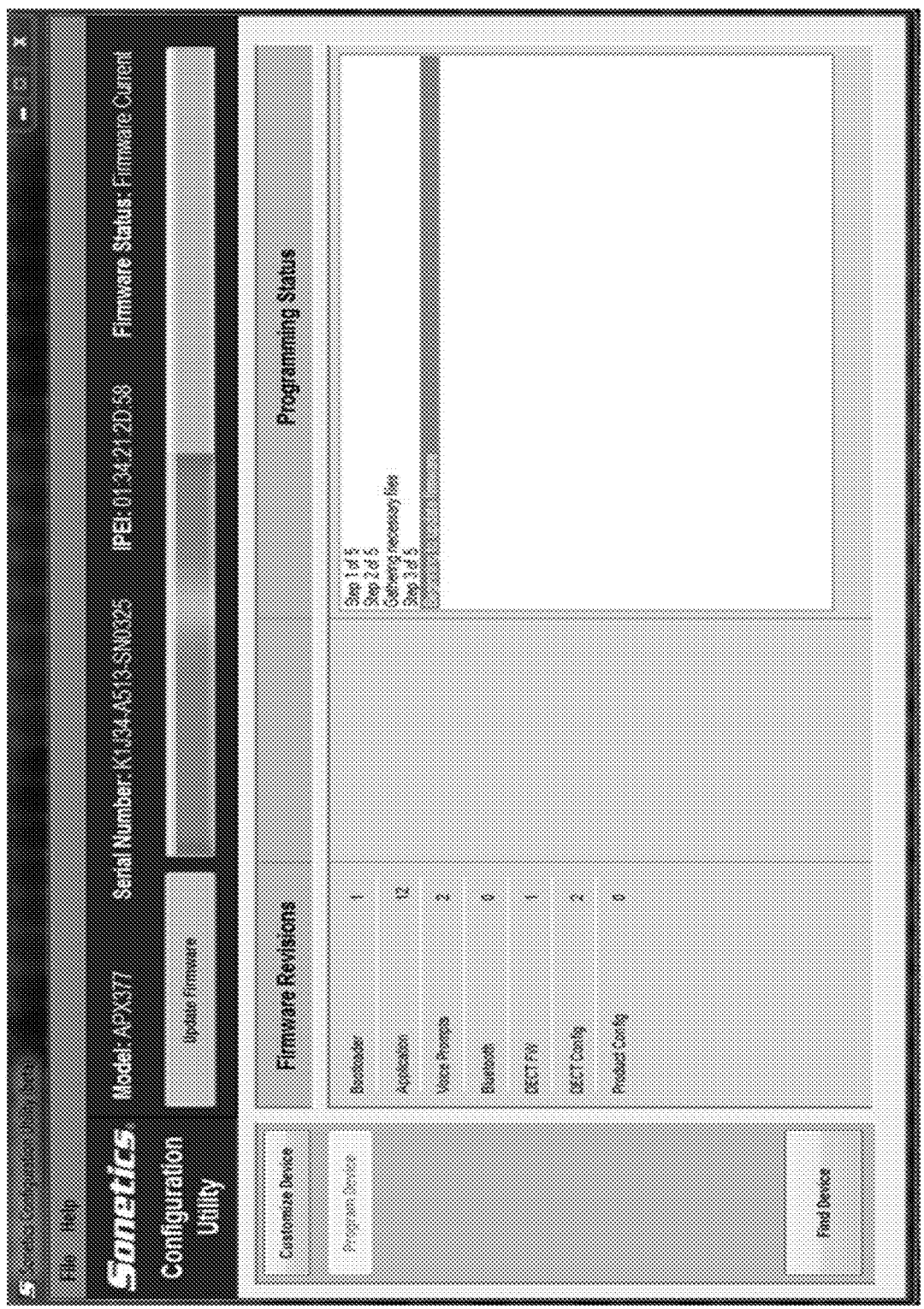
FIG. 13 is an additional screen shot view illustrating the exemplary embodiment of the user interface of the programming system for the exemplary embodiment of the multiple communication mode headset in the first exemplary configuration of FIG. 1, according to a preferred embodiment of the present invention.

FIG. 13 is a second screen shot 1300 view illustrating the exemplary embodiment of the user interface 1006 of the programming system for the multiple communication mode headset 100 of FIG. 1, according to a preferred embodiment of the present invention. The text on the screen 1300 shot is not intended to convey textual information in this patent application, but only image information. Screen 1300 enables the user 1008 to track firmware upgrades 1012 and to program the multiple communication mode headset 100 directly. Firmware upgrades 1012 may be used to correct existing firmware 1106 or to add capabilities to the multiple communication mode headset 100 that it previously did not have. For a non-limiting example of added capability, the firmware upgrade 1012 released Mar. 14, 2016 added a noise gate to the DECT7 audio path, cutting out DECT7 noise when no voice signal was present. In a particular embodiment, the user 1008 may program using the C programming language to program the digital signal processor 1104 within the communications system 1102.

The embodiments described above are merely exemplary. Such examples are limited only by the claims below in light of the specification above. Those of skill in the art, enlightened by the present disclosure, will understand the variety of ways that the multiple communication mode headset 100 may be implemented.

We claim:

1. A multiple communication mode headset system comprising a programmable communications headset further comprising:
   a. a DECT7 transceiver in communication with:
      i. an RF switch that selects between a first antenna and a second antenna, responsive to signal quality; and
      ii. a digital signal processor (DSP);
   b. a Bluetooth® transceiver in communication with:
      i. a third antenna; and
      ii. said DSP;
   c. a two-way radio port:
      i. adapted to operate in communication, via an adapter, with a two-way radio; and
      ii. in communication with said DSP; and
   d. a USB socket adapted to operate in communication:
      i. via a USB cable, with a computer; and
      ii. with said DSP; and
   e. wherein said DSP includes a noise gate in a DECT7 audio path, cutting out DECT7 noise when no voice signal is present.

2. The multiple communication mode headset system of claim 1, wherein said DSP is configured to enable a listen-only mode.

3. The multiple communication mode headset system of claim 2, comprising a push-to-talk button that enables a user to momentarily talk on any available communications slot during listen-only mode.

4. The multiple communication mode headset system of claim 1, wherein said DECT7 transceiver is adapted to provide a user-selectable choice of one of high definition wide band transmission mode and narrow band transmission mode.

5. The multiple communication mode headset system of claim 1, wherein said DECT7 transceiver is adapted to provide a user-selectable choice of one of:
   a. radio transmit mode to multiple receivers via a base station in communication with an intercom in communications with a plurality of base stations; and
   b. deselection of said radio transmit mode.

6. The multiple communication mode headset system of claim 1, wherein said DECT7 transceiver is adapted to provide a user-selectable choice of:
   a. access to multiple DECT7 channels from said multiple communication mode headset system; and
   b. access to a single DECT7 channel from said multiple communication mode headset system.

7. The multiple communication mode headset system of claim 1, wherein said DECT7 transceiver in communication with said DSP is adapted to provide an audible alarm responsive to a multiple communication mode headset of said multiple communication mode headset system moving out of range of any paired base station.

8. The multiple communication mode headset system of claim 1, further comprising a microcontroller in communication with said Bluetooth® transceiver and said DSP, wherein at least one of said DSP and a portion of said microcontroller are adapted to be reprogrammed responsive to signals output by said Bluetooth® transceiver to said microcontroller.

9. The multiple communication mode headset system of claim 1, further comprising a microcontroller in communication with said USB socket and said DSP, wherein at least one of said DSP and a portion of said microcontroller are adapted to be reprogrammed responsive to signals communicated via said USB socket to said microcontroller.

10. The multiple communication mode headset system of claim 9, wherein parameters in at least one of said microcontroller and said DSP are adapted to be modified responsive to signals communicated via said USB socket to said microcontroller, said parameters comprising at least one of:
    a. on/off state of a listen-through logic;
    b. a threshold volume level for said listen-through logic;
    c. state of a noise gate for a noise cancelling microphone;
    d. toggle state between DECT7 radio and intercom;
    e. toggle state between push-to-talk or voice activation;
    f. on/off state of a sound pressure level dosimeter;
    g. on/off state of a wired two-way radio output;
    h. bandwidth of said DECT7 communications.

11. A multiple communication mode headset system comprising a programmable communications headset further comprising:
    a. a DECT7 transceiver in communication with:
       i. an RF switch that selects between a first antenna and a second antenna, responsive to signal quality; and
       ii. a digital signal processor (DSP);
    b. a Bluetooth® transceiver in communication with:
       i. a third antenna; and
       ii. said DSP;
    c. a two-way radio port:
       i. adapted to operate in communication, via an adapter, with a two-way radio; and
       ii. in communication with said DSP; and
    d. a USB socket adapted to operate in communication:
       i. via a USB cable, with a computer; and
       ii. with said DSP;
    e. a microcontroller in communication with said Bluetooth® transceiver and said DSP, wherein at least one of said DSP and a portion of said microcontroller are adapted to be reprogrammed responsive to signals output by said Bluetooth® transceiver to said microcontroller; and
    f. wherein said DSP includes a noise gate in a DECT7 audio path, cutting out DECT7 noise when no voice signal is present.

12. The multiple communication mode headset system of claim 11, further comprising said microcontroller in communication with said USB socket and said DSP, wherein at least one of said DSP and a portion of said microcontroller are adapted to be reprogrammed responsive to signals communicated via said USB socket to said microcontroller.

13. The multiple communication mode headset system of claim 11, further comprising said microcontroller in communication with said two-way radio port and said DSP.

14. The multiple communication mode headset system of claim 11, wherein parameters in at least one of said microcontroller and said DSP are adapted to be modified responsive to signals communicated via said USB socket to said microcontroller, said parameters comprising at least one of:
    a. on/off state of a listen-through logic;
    b. a threshold volume level for said listen-through logic;
    c. state of a noise gate for a noise cancelling microphone;
    d. toggle state between DECT7 radio and intercom;
    e. toggle state between one of push-to-talk and voice activation;

f. on/off state of a sound pressure level dosimeter;
g. on/off state of a wired two-way radio output;
h. bandwidth of said DECT7 communications.

15. The multiple communication mode headset system of claim 11, wherein said DSP is adapted to enable a listen-only mode, wherein said multiple communication mode headset system comprises a push-to-talk button that enables a user to momentarily talk on any available communications slot during listen-only mode.

16. The multiple communication mode headset system of claim 11, wherein said DECT7 transceiver is adapted to provide:
 a. a user-selectable choice of one of high definition wide band transmission mode and narrow band transmission mode;
 b. a user-selectable choice of one of:
  i. radio transmit mode to multiple receivers via a base station in communication with an intercom in communications with a plurality of base stations; and
  ii. deselection of said radio transmit mode.

17. The multiple communication mode headset system of claim 1, wherein said DECT7 transceiver is adapted to provide a user-selectable choice of:
 a. access to multiple DECT7 channels from said multiple communication mode headset system; and
 b. access to a single DECT7 channel from said multiple communication mode headset system.

18. The multiple communication mode headset system of claim 11, wherein said DECT7 transceiver in communication with said DSP is adapted to provide an audible alarm responsive to a multiple communication mode headset of said multiple communication mode headset system moving out of range of any paired base station.

19. The multiple communication mode headset system of claim 11, wherein
 a. said DSP is adapted to enable a listen-only mode, wherein said multiple communication mode headset system comprises a push-to-talk button that enables a user to momentarily talk on any available communications slot during listen-only mode;
 b. said DECT7 transceiver is adapted to provide:
  i. a user-selectable choice of one of high definition wide band transmission mode and narrow band transmission mode;
  ii. a user-selectable choice of one of:
   1. radio transmit mode to multiple receivers via a base station in communication with an intercom in communications with a plurality of base stations; and
   2. deselection of said radio transmit mode;
 c. said DECT7 transceiver is adapted to provide a user-selectable choice of:
  i. access to multiple DECT7 channels from said multiple communication mode headset system; and
  ii. access to a single DECT7 channel from said multiple communication mode headset system;
 d. said DECT7 transceiver in communication with said DSP is adapted to provide an audible alarm responsive to a multiple communication mode headset of said multiple communication mode headset system moving out of range of any paired base station.

20. A multiple communication mode headset system comprising a programmable communications headset further comprising:
 a. a DECT7 transceiver in communication with:
  i. an RF switch that selects between a first antenna and a second antenna, responsive to signal quality; and
  ii. a digital signal processor (DSP);
 b. a Bluetooth® transceiver in communication with:
  i. a third antenna; and
  ii. said DSP;
 c. a two-way radio port:
  i. adapted to operate in communication, via an adapter, with a two-way radio; and
  ii. in communication with said DSP; and
 d. a USB socket adapted to operate in communication:
  i. via a USB cable, with a computer; and
  ii. with said DSP;
 e. a microcontroller in communication with said Bluetooth® transceiver and said DSP, wherein at least one of said DSP and a portion of said microcontroller are adapted to be reprogrammed responsive to signals output by said Bluetooth® transceiver to said microcontroller;
 f. said microcontroller in communication with said USB socket and said DSP, wherein at least one of said DSP and a portion of said microcontroller are adapted to be reprogrammed responsive to signals communicated via said USB socket to said microcontroller;
 g. said microcontroller in communication with said two-way radio port and said DSP;
 h. wherein said DSP includes a noise gate in the DECT7 audio path, cutting out DECT7 noise when no voice signal is present; and
 i. wherein parameters in at least one of said microcontroller and said DSP are adapted to be modified responsive to signals communicated via said USB socket to said microcontroller, said parameters comprising at least one of:
  i. on/off state of a listen-through logic;
  ii. a threshold volume level for said listen-through logic;
  iii. state of a noise gate for a noise cancelling microphone;
  iv. toggle state between DECT7 radio and intercom;
  v. toggle state between one of push-to-talk and voice activation;
  vi. on/off state of a sound pressure level dosimeter;
  vii. on/off state of a wired two-way radio output;
  viii. bandwidth of said DECT7 communications.

* * * * *

UNITED STATES PATENT AND TRADEMARK OFFICE
CERTIFICATE OF CORRECTION

PATENT NO. : 9,998,850 B2  
APPLICATION NO. : 15/190428  
DATED : June 12, 2018  
INVENTOR(S) : Broadley et al.

Page 1 of 1

It is certified that error appears in the above-identified patent and that said Letters Patent is hereby corrected as shown below:

On the Title Page

At Item (73), Assignee:  
Delete: "Sonetyics Holdings, Inc.,"  
And insert: --Sonetics Holdings Inc.,--

Signed and Sealed this  
Twenty-first Day of August, 2018

Andrei Iancu  
*Director of the United States Patent and Trademark Office*